United States Patent [19]

Titus, IV

[11] 4,198,549
[45] Apr. 15, 1980

[54] MULTIPLEXED CENTRAL DICTATION SYSTEM

[75] Inventor: Theodore Titus, IV, Tucker, Ga.

[73] Assignee: Lanier Business Products, Inc., Atlanta, Ga.

[21] Appl. No.: 940,881

[22] Filed: Sep. 11, 1978

[51] Int. Cl.² .................. G11B 19/00; H04M 11/10
[52] U.S. Cl. ......................... 179/100.1 DR; 179/6 E
[58] Field of Search ............... 179/100.1 DR, 6 E, 20, 179/31, 32; 178/4.1 R, 4.1 B

[56] References Cited

U.S. PATENT DOCUMENTS

| | | | |
|---|---|---|---|
| 3,328,536 | 6/1967 | Bolick, Jr. | 179/100.1 DR |
| 3,527,891 | 9/1970 | Johnston | 179/2 |
| 3,647,985 | 3/1972 | Langendorf et al. | 179/100.1 DR |
| 3,671,680 | 6/1972 | Nye et al. | 179/100.1 DR |
| 3,706,858 | 12/1972 | Keitel | 179/100.1 DR |
| 3,712,961 | 1/1973 | Nye et al. | 179/100.1 DR |
| 3,725,589 | 4/1973 | Golden | 179/100.1 DR |

Primary Examiner—Daryl W. Cook
Attorney, Agent, or Firm—Jones, Thomas & Askew

[57] ABSTRACT

A remote control dictation system is disclosed. The control of the system is implemented via a single transmission line tapped at various points to interface with recorders and dictate stations. A plurality of channels are defined in the system, each channel having two transmit-receive frequencies associated therewith. An embodiment of the invention includes a controller with decision making capability. Control signals from the dictate stations and the controller as well as audio signals are multiplexed onto the transmission line. Means for selectively or automatically changing channels for the recorders or the dictate stations are disclosed so that any dictate station may be operatively connected with any recorder in the system.

20 Claims, 3 Drawing Figures

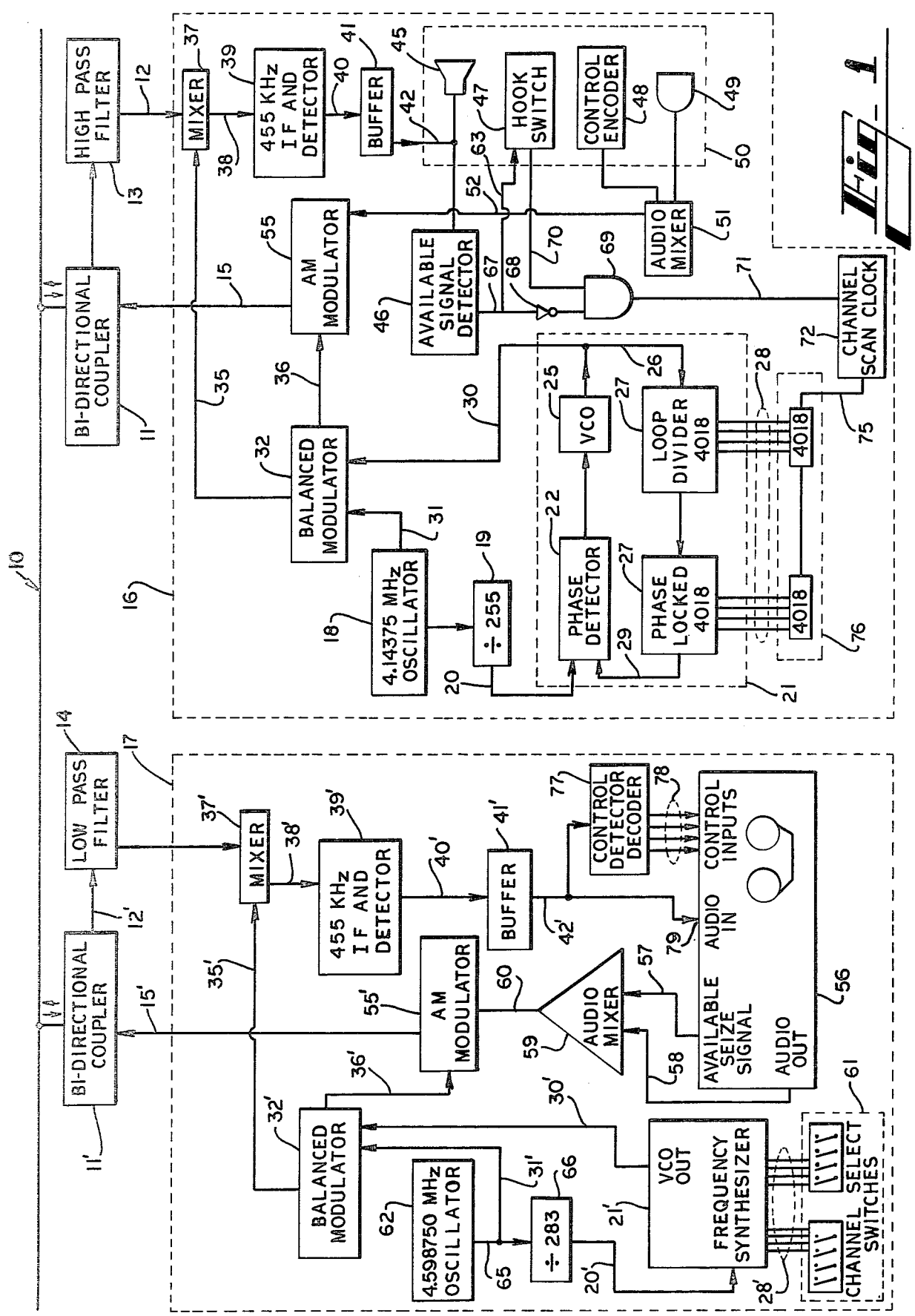

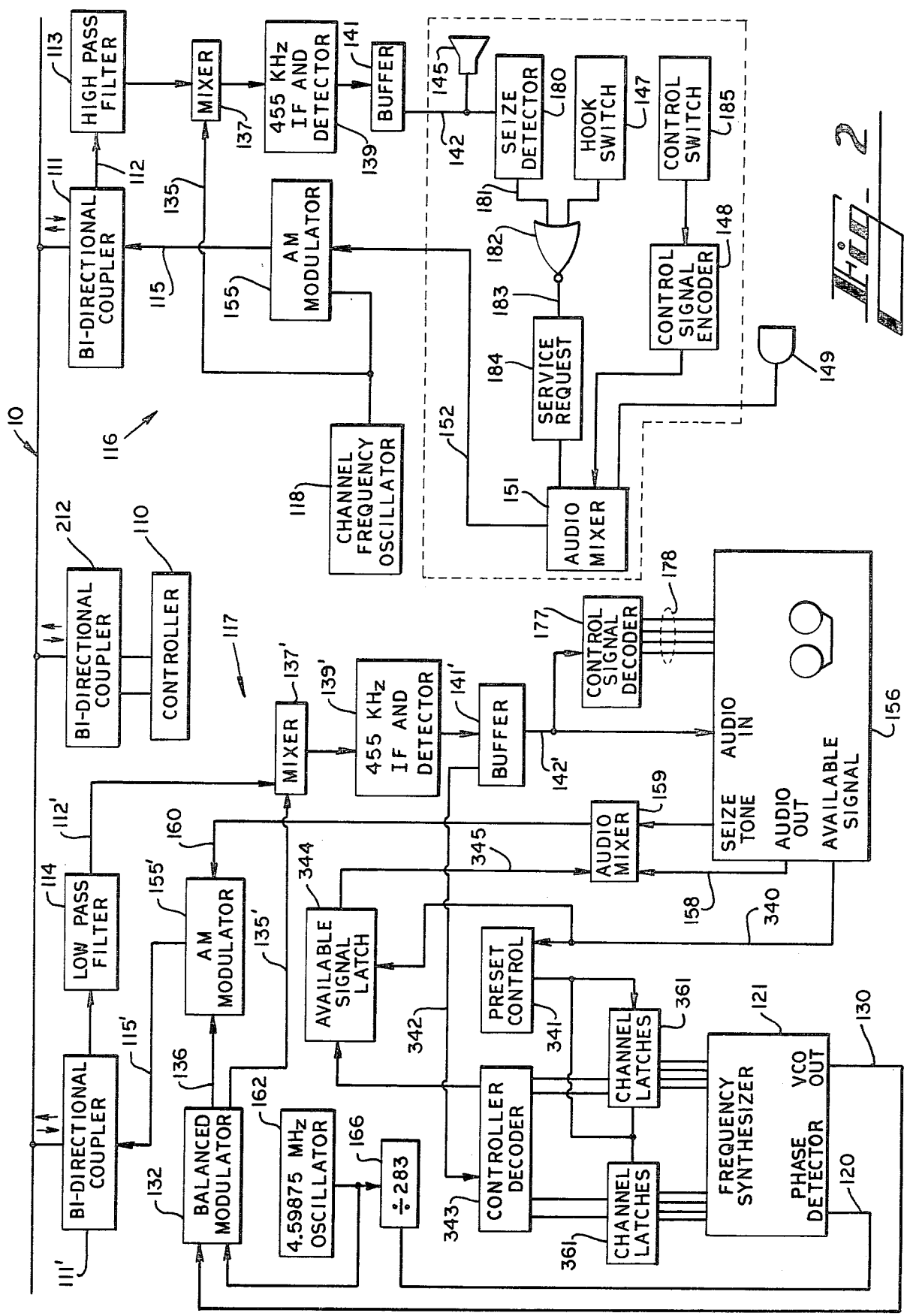

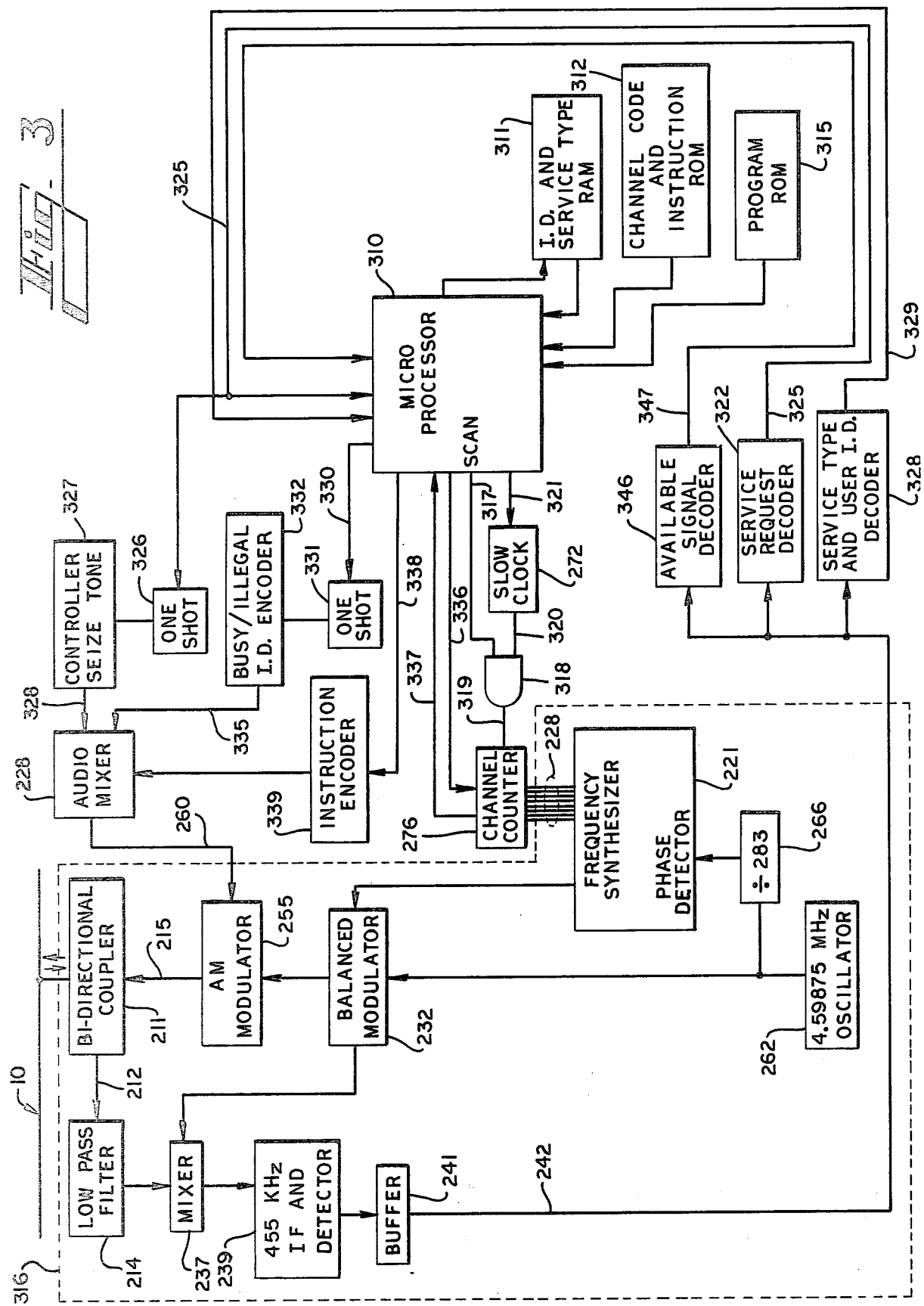

4,198,549

MULTIPLEXED CENTRAL DICTATION SYSTEM

BACKGROUND OF THE INVENTION

Central dictation systems have reached a high level of sophistication and include many automatic control features such as those shown in applicant's co-pending application Ser. No. 782,947, now abandoned, a continuation of which is pending as application Ser. No. 23,951. However, prior central dictation systems universally required at least a two conductor hard wired connection from each recorder and each dictate station to either a central control unit or switching system. This requirement has necessitated a large number of bulky cables to be run from the central control or switching panel to the various dictate stations and recorders in the system.

For central dictation systems serving a large number of users at various locations in a building, such as a hospital, the amount of cable required to implement such a system is quite costly and occupies a great deal of raceway and conduit space.

SUMMARY OF THE INVENTION

It is an object of this invention to provide a central dictation system wherein a plurality of dictate stations may be selectively connected to a plurality of dictation recorders without the necessity of a dedicated tow-wire path from a particular dictate station to a particular recorder during use.

It is another object of this invention to provide a central dictation system wherein a dictate station may automatically select an available recorder without the use of stepping relays, stepping motor operated switches, or multiple input transistor switches.

It is still a further object of this invention to provide a central dictation system wherein all components of the system may be interconnected by tapping a single two conductor transmission line.

It is still a further object of this invention to provide an intelligent control means for the system which can control user and/or dictate station access to certain recorders without the necessity of a human operator.

The invention disclosed herein accomplished these and other objects by means of a central dictation system entirely interconnected with a single transmission line. Conventional bi-directional couplers are used to tap the transmission line at any location in the system where a dictate station, dictation recorder, or central control unit is required. The transmission line carries both audio and control signal information as well as a DC power supply voltage.

A plurality of channels are defined within the system, each channel comprising two discrete frequencies. When a particular dictate station is operatively connected to a particular recorder on a particular channel, the dictate station will transmit on a first frequency of that channel and receive on the second frequency of that channel. Likewise the recorder will transmit on the second frequency and receive on the first frequency.

Both audio and control signals passing between a dictate station and a recorder are modulated on a radio frequency carrier which is then carried out over the transmission line.

The plurality of channels are defined by a fixed frequency oscillator and a phase locked loop frequency synthesizer.

One embodiment of the invention also includes an intelligent controller constructed around a microprocessor which is controlled to provide that dictation from a certain set of dictate stations will be connected only to certain recorders, or preferentially to certain recorders in the system. The control unit also has the capability of requiring valid user identification signals to be entered by the user before connection to a particular set of recorders will be allowed.

BRIEF DESCRIPTION OF THE DRAWING

FIG. 1 is a schematic representation of a first preferred embodiment of the present invention.

FIG. 2 is a schematic representation of a second preferred embodiment of the present invention which includes an intelligent control unit shown in block diagram form.

FIG. 3 is a schematic representation of the intelligent controller of FIG. 2.

DETAILED DESCRIPTION

FIG. 1 shows a first preferred embodiment of the present invention. As noted above, the entire central dictation system of the present invention is interconnected by a single transmission line. In the preferred embodiment the transmission line 10 of the system is a conventional 75 ohm coaxial transmission line. Each component of the system is coupled to the transmission line 10 by means of a bi-directional coupler 11 or 11' having an output line 12 or 12' and an input line 15 or 15'. As will be known to those skilled in the art, such bi-directional couplers are conventional in nature and have components selected to match the impedance of the line at the position tapped so as not to cause an inordinant standing wave ratio within the system.

FIG. 1 is a system having a dictate station 16 and a recorder 17. It will be understood by those skilled in the art that the single recorder 17 and dictate station 16 are shown by way of example in the preferred embodiment and that the usefulness of the invention is brought to bear when large numbers of recorders such as 17 and dictate stations such as 16 are connected to transmission line 10.

As will be explained in more detail below, the invention has a plurality of channels defined within the central dictation system. In the preferred embodiment there are twenty-four such channels, each channel comprising a transmit-receive frequency pair. The two frequencies comprising each transmit-receive pair in the preferred embodiment differ by a constant frequency of 455 kilohertz. This was selected because of the ready availability of intermediate frequency stage components tuned to 455 kilohertz. Of course, other frequency differences for the transmit-receive pairs are possible. The channels are separated by an even multiple of 16,250 hertz. Thus, the lower frequency of the transmit-receive pair for channel one will differ from the lower frequency of the transmit-receive pair for channel two by 16,250 hertz and the upper frequencies of the transmit-receive pairs comprising channel one and channel two will differ by 16,250 hertz.

The operation of the preferred embodiment can be understood by examining FIG. 1 in detail.

Dictate station 16 is shown as having a 4.14375 megahertz crystal controlled oscillator 18. The output of oscillator 18 is fed into a divide by 255 circuit 19 the output of which is the phase detector input 20 to frequency synthesizer 21. As shown in detail for the dictate station of FIG. 1, frequency synthesizer 21 is a phase locked loop frequency synthesizer having a phase detector 22 driving a voltage controlled oscillator 25. The output of voltage control oscillator 25 is fed along line 26 to phase locked loop divider 27. As is known to those skilled in the art, a divide circuit may be implemented by cascading conventional integrated circuit counters and the divisor may be selectively varied by changing the inputs on preset lines 28 as shown in FIG. 1. The divided output of phase lock loop divider 27 appears on line 29 as another input to phase detector 22. As is well known to those skilled in the art, phase detector 22 will have an output that changes in magnitude as the phase difference of the signals on its two inputs 20 and 29 varies. When this situation occurs, the output of phase detector 22 will drive voltage controlled oscillator 25 toward a frequency that tends to eliminate this phase difference and thus establish a "lock" on the signal appearing at phase detector input 20. Note that the output of divide circuit 19 appearing on phase detector 20 will be 16,250 hertz, which is the reference frequency for the preferred embodiment shown in FIG. 1.

As will be understood by those skilled in the art, when phase lock loop divider 27 is dividing by one, the output of voltage control oscillator 25 appearing on lines 26 and 30 will be 16,250 hertz. When phase lock loop divider 27 is dividing by two, the output of voltage control oscillator 25 must be at 32,500 hertz in order for the input 29 to phase detector 22 to have 16,500 hertz present thereon. Therefore it can be seen, as is known to those skilled in the art, that frequency synthesizer 21 will provide an output on line 30 that is an integral multiple of the reference frequency present at phase detector input 20. The multiple of the reference frequency appearing as an output on line 30 will be determined by the divisor of the phase locked loop divider chain which is determined by the preset inputs 28 of the frequency synthesizer.

The output 30 of voltage controlled oscillator 25, which is the VCO output of frequency synthesizer 21, is fed into one input of a balanced modulator 32. The other input to balanced modulator 32 appears on line 31 and comes from 4.14375 megahertz oscillator 18. As is known to those skilled in the art, several outputs are available from a balanced modulator and in the preferred embodiment the outputs on lines 35 and 36 are the upper side bands of the balanced modulator output. Thus it can be seen that the frequency of the outputs on lines 35 and 36 can be expressed as 4.14375 megahertz+(N×16,250 hertz), where N is determined by the preset inputs 28 to frequency synthesizer 21.

The output on line 35 is one input to mixer 37. The other input to mixer 37 is the incoming signal appearing on line 12 from bi-directional coupler 11 and high pass filter 13. The output of mixer 37 appears on line 38 and is the input to intermediate frequency and detector stage 39. As is known to those skilled in the art the output 38 of mixer 37 will contain frequency components of the individual signals appearing on input lines 12 and 35 and components at the sum and difference of those frequencies. In the preferred embodiment of the invention the frequency of intermediate frequency and detector stage 39 is 455 kilohertz and therefore the signal appearing at output 40 will contain the demodulated components of the signal appearing on line 12 which were on a carrier 455 kilohertz above or below the frequency present on line 35. In the preferred embodiment the frequencies for the transmit-receive pairs and the cut-off frequency for high pass filter 13 are chosen such that there will be no signal present at a frequency 455 kilohertz below the signal on line 35. Thus the output 40 will be the detected output of a signal present at a frequency 455 kilohertz above the frequency of the signal appearing on line 35. Thus it will be obvious to those skilled in the art that the output appearing on line 40 will be the demodulated output of a signal whose carrier frequency is 4.14375 megahertz+(N×16,250+455 kilohertz).

It can further be seen that in the preferred embodiments of the present invention, for a dicate station or a recorder station, the oscillator serving as the carrier frequency oscillator of the station transmitter serves as the local oscillator for the station receiver.

The signal on line 40 is fed into audio frequency buffer 41 whose output appears on line 42. This audio frequency output is fed to loudspeaker 45 and available signal detector 46.

The components located physically in the normal dictation handset are shown surrounded by block 50 in FIG. 1. These include loudspeaker 45 over which the user may listen to played back dictation, hook switch 47, control encoder 48, and microphone 49. In the preferred embodiment control signals are conventional dual tone audio frequency signals such as those used in the Touch Tone ® brand telephone. When the user of dictate station 16 is dictating, or providing a control signal to a recorder by a control encoder 48, signals from control encoder 48 and microphone 49 are mixed in audio mixer 51 and the mixed output appears on line 52.

As can be seen from inspection of FIG. 1, line 52 and line 36, an output of balanced modulator 32, are inputs to AM modulator 55. The output of AM modulator 55 appears on line 15 as the outgoing branch of bi-directional coupler 11. It will thus be obvious to those skilled in the art that the audio signals provided by control encoder 48 and microphone 49 are modulated onto a carrier whose frequency is 4.14375 megahertz+(N×16,250 hertz). From the foregoing description is should be apparent that for any given set of inputs on phase locked loop preset controls 28, dictate station 16 will transmit on a frequency 4.14375 megahertz+(×16,250 hertz) and receive at a frequency 455 kilohertz above that.

It is of course possible to use other modulation schemes for the audio and control signals within the scope of the present invention. For example, various combinations of amplitude, frequency and other phase modulation schemes may be used to modulate both the audio and control signals.

Turning for a moment to the recording station, shown as block 17 in FIG. 1, it can be seen that recording station 17 is coupled to transmission line 10 through a bi-directional coupler 11' of the same type as coupled dictate station 16. Record station 17 includes a conventional central dictation recorder 56 which will provide an available signal at line 57 whenever the recorder is available to be seized by a dictate station. The available signal is mixed with any audio output of the recorder appearing on line 58 by audio mixer 59 and the output thereof appears on line 60.

Assume for a moment that recorder 56 is in fact available and that the available signal appearing on line 57 also appears on line 60 as an input to AM modulator 55'. Also assume that channel select switches 61 controlling preset inputs 28' to frequency synthesizer 21' are set so that the phase locked loop divider of frequency synthesizer 21' (not shown in detail) divides by three. Note also that master oscillator 62 for the record station 17 runs at 4.59875 megahertz. The output of oscillator 62 appears at point 65 and is divided by 283 by divide circuit 66. This quotient appears as the reference frequency 16,250 on line 20' which is the phase detector input to frequency synthesizer 21'. Therefore a signal of 48,750 hertz appears on the VCO output 30' of frequency synthesizer 21'. The signal at point 65 also appears on line 31' and this along with the signal on line 30' are the inputs to balanced modulator 32'. The upper side band output of balanced modulator 32' appears on line 36' and, continuing with the example, will have a frequency of 4.6475 megahertz. Thus the available signal appearing on line 60 will be modulated onto the carrier appearing on line 36' by AM modulator 55' and this signal will appear on line 15' and be coupled onto transmission line 10 by bi-directional coupler 11'.

Assume that hook switch 47 of dictate station 16 is on-hook and that no available signal is presently being detected by available signal detector 46. When no available signal is detected by detector 46, a logical zero output appears on line 67 which is inverted by inverter 68 and applies a logical one input to AND gate 69. Likewise when hook switch 47 is on-hook a logical one appears on line 70 making the other input to AND gate 69 one, and thus making output 71 a logical one. Output 71 is an enable input to channel scan clock 72 which is a slow clock running at approximately 10 hertz in the preferred embodiment. Each time channel scan clock 72 changes state, an output appears on line 75 which is the clock input to channel scan counter 76. The outputs of channel scan counter 76 are tied to phase locked loop divider preset switches 28. Thus it can be seen that every time an output is obtained from channel scan clock 72, phase locked loop divider 27 changes its divisor by one. As long as a one output from AND gate 69 appears at output 71, phase locked loop divider 27 will sequentially divide by one, two, three, . . . up to the highest divisor used in the system, at which point is toggles back to one.

Assume that phase locked loop divider 27 has divided by one, then two, and available signal detector 46 has not detected an available signal. On the next output of channel scan clock 72, channel scan counter 76 provides preset inputs on lines 28 that cause phase locked loop divider 27 to divide by three. Thus the frequency synthesizer output appearing on line 30 will be three times the reference frequency or 48,750 hertz. This is heterodyned with the 4.14375 megahertz output of oscillator 18 to provide a signal of 4.1925 megahertz on line 35. With this frequency appearing on line 35, the output of intermediate frequency stage 39 appearing on line 40 will detect any signal modulated on a carrier 455 kilohertz above the signal on line 35 which means that output 40 is the detected output for a carrier of 4.6475 megahertz. Recall that this is precisely the carrier frequency appearing on line 36' of record station 17 and thus the available signal appearing on line 60 of recording station 17 will be demodulated and detected at output 40 of dictate station 16. This signal appears on line 42, is detected by available signal detector 46 thus making a logical one appear on line 67 which drives the output 71 of AND gate 69 to its logical zero state thus terminating the operation of channel scan clock 72.

Thus it can be seen that when hook switch 47 is in its on-hook position and no available signal is being detected by available signal detector 46, the frequency synthesizer 21 will continually scan the channels of the system until an available signal is detected. At that point, channel scan counter 76 stops counting and "sits on that channel" waiting for the user of dictate station 16 to take hook switch 47 off-hook and thus seize recorder 56.

If the user of dictate station 16 removes the handset (not shown) in order to place hook switch 47 in its "off-hook" position, a zero appears on line 70 thus terminating the operation of channels scan clock 72 and assuring that channel scan counter 76 has preset inputs 28 set on the station last producing an available signal. Line 63 provides the output of available signal detector 46 to hook switch 47. A logical zero on line 63 prevents hook switch 47 from establishing an off-hook condition and thereby prevents connection of dictate station 50 to a channel already in use. From the above it should also be obvious that when the hook switch 47 is on-hook, and an available signal on the channel on which frequency synthesizer 21 is "sitting" is lost due to another dictate station in the system seizing that recorder, the loss of the logical one output on line 67, will cause output 71 of AND gate 69 to go to its logical one state and reactivate channel scan clock 72 so that it "searches" sequentially until another available signal is located. Thus it can be seen that anytime a dictate station is not in use, that station will "search" until it finds a channel carrying an available signal. When that available signal is lost due to another dictate station in the system seizing that recorder, the dictate station again searches until an available signal is found and it will then "sit on that channel".

From the symmetry between the transceiver sections of dictate station 16 and recorder station 17 it will be obvious to those skilled in the art that the dictate stations of the preferred embodiment receive at the higher frequency of the transmit-receive pair of frequencies comprising a channel in this system, and transmit on the lower frequency of the pair. Likewise record station 17 receives at the lower frequency and transmits on the higher. It should be noted that the output 40' from intermediate frequency and detector stage 39' is responsive to the lower frequency sideband appearing on line 38'. The audio output appearing on line 42' contains both dictated audio signals which are fed into recorder 56 at audio input 79, and dual tone control signals which are decoded by control detector decoder 77 and applied to control inputs 78 to recorder 56 for controlling the dictation, reverse, and other modes of recorder 56.

As will be obvious to those skilled in the art the control signals detected by control detector decoder 77 can be other than dual tone audio frequency control signals and is possible to have other signals outside the normal frequency range of human speech, but still within the 16,250 hertz bandwidth of the channel. It should likewise be obvious that other options are available such as frequency modulating the audio signals comprising dictation, and amplitude modulating control signals in the system. Likewise the available signal detected by available signal detector 46 could be simply the absence of a conventional "seize tone" from a conventional dictation recorder.

Turning now to FIG. 2, a second preferred embodiment of this invention which includes an intelligent controller 110 is shown. An exemplary dictation station 116 and an exemplary record station 117 are shown in FIG. 2. In the second preferred embodiment, each dictate station such as dictation station 116 is associated with a single channel in the system, the frequency of which is determined by channel frequency oscillator 118. This is to be contrasted with the association of a single recorder with each channel in the first preferred embodiment, the frequency of the channel being determined by a channel select switches 61 of frequency synthesizer 21'. In the second preferred embodiment shown in FIG. 2, channel frequency oscillator 118 will run at the lower frequency of the transmit-receive pair comprising the particular channel associated with dictate station 116. The transceiver hardware including modulator 155, mixer 137, intermediate frequency and detector stage 139 operates on the same principle as the transceiver hardware previously explained and such explanation will not be repeated. FIG. 3 shows controller 110 in detail and shows that the controller 110 is controlled by microprocessor 310 with the software thereof contained in identification and service type random access memory 311, channel code and instruction read only memory 312, and program read only memory 315. As will be understood by those skilled in the art, read only memories 312 and 315 are not necessarily separate physical components but are shown thereas in FIG. 3 in order to illustrate their functional differences. Also certain inputs and outputs from microprocessor 310 are represented schematically, when in the physical embodiment they would be certain logic states on a data or an output bus.

The ID and service type random access memory 311 is a portion of random access memory containing information that identifies valid user identification codes (ID codes) and service type codes for particular ID codes if used in the system. Thus if only holders of certain ID codes were allowed to dictate on a particular dictation recorder, such as a priority recorder, that information and appropriate codes would be stored in ID and service type random access memory 311.

Channel code and instruction read only memory 312 is a portion of read only memory which contains information relating what codes should appear on the output bus to identify a given channel in the system as well as the proper logic state that should appear on the output bus of microprocessor 310 to encode a particular instruction from controller 110. Program read only memory 315 contains the program control logic which steps microprocessor 310, and thus controller 110 through its proper sequence of steps in response to inputs thereto.

The operation of the second preferred embodiment can best be explained by way of example. Assume that dictate station 116 begins in its on-hook condition and that record station 117 is available for seizure. Also assume that the frequency output of channel frequency oscillator 118 of dictate station 116 is that frequency corresponding to the lower frequency of the transmit-receive pair for channel three as channel three is defined in this system.

When hook switch 147 is in its on-hook condition a logical one is applied to an input of NOR gate 182 thus causing a logical zero to appear on line 183 and preventing service request oscillator 184 from being activated to produce a signal which the system defines as a service request signal. When the user of dictate station 116 removes his microphone from a cradle (not shown) and places hook switch 147 in its off-hook condition, a zero appears on the output of hook switch 147. As long as no seize signal is being detected by seize detector 180, a zero will likewise appear on line 181. Thus line 183 switches to a logical one state activating service request signal generator 184. It can thus be seen that so long as hook switch 147 is in its off-hook condition and seize detector 180 has failed to detect a seize signal, service request oscillator 184 will be active and generate a service request signal which is fed into audio mixer 151 and thus transmitted to transmission line 10 at the lower frequency of the transmit-receive frequency pair associated with channel three.

Turning again to FIG. 3, it should first be noted that controller 110 has a transceiver section of the same variety as the other transceiver sections described herein. This is composed of bi-directional coupler 211 with input and output lines 212 and 215; mixer 237, intermediate frequency stage 239, buffer 241, oscillator 262, divide by 283 circuit 266, frequency synthesizer 221, balanced modulator 232, and AM modulator 255. The received output from transceiver section 316 appears on line 242.

During its normal polling operation, microprocessor 310 has a scan output which causes a logical one to appear on line 317. A slow clock 272 is synchronized with the system clock as shown by the connection of line 321 and has a slow output appearing on line 320. Scan line 317 and output 320 are the inputs to AND gate 318 whose output 319 is connected to the clock input of channel counter 276. Thus it can be seen that when microprocessor 310 is operating in its polling mode, a logical one appears on line 319 every time a logical one appears on line 320, and channel counter 276 is incremented by one. Since the outputs of channel counter 276 are connected to the phase lock loop divider preset inputs 228 of frequency synthesizer 221, the transceiver will continually and sequentially poll each channel of the system that is associated with a dictate station.

Continuing with the example, assume that channel counter 276 arrives at the count associated with channel three. Recall that, in the example, channel three is providing a service request signal which appears on line 242 when channel counter 276 reaches the appropriate count. This service request signal is detected by service request decoder 322 which causes a logical one to appear on line 325. Recall that line 325 may be a schematic representation of a certain data state on the data bus of microprocessor 310 and the program of microprocessor 310 would cause the microprocessor to check the state of bus for this state during each count of channel counter 276.

The presence of a logical one on line 325 causes scan line 317 to go to its logical zero state thus causing a logical zero to appear on line 319 and inhibiting channel counter 276. It can now be seen that transceiver section 316 of controller 110 is now locked onto channel three of the system. The logical one on line 325 triggers one shot 326 which activates controller seize tone generator 327. This causes a distinctive tone notifying the user that the controller has been seized to appear on line 328 which is provided as an input to audio mixer 228 and thus transmitted back over line 215 to transmission line 10.

The program contained in program read only memory 315 then causes microprocessor 310 to wait a predetermined length of time for a user ID code and a service type request. The user of dictate station 116 then enters a sequence of control key action at control switch panel 185 which are encoded by control signal encoder 148 and thus transmitted over transmission line 10 to controller 110. In the preferred embodiment these signals are again dual tone audio frequency signals which appear on line 242 and are detected by user ID and service type decoder 328 which causes a specific logic sequence to appear on line 329 as an input to microprocessor 310. These signals are checked against the table of valid signals found in ID and service type random access memory 311.

If the user of dictate station 116 has entered an invalid ID code which microprocessor 310 cannot find in random access memory 311, or has requested a service type (such as priority dictation) to which he is not entitled, microprocessor 310 causes a logical one to appear on line 330. This triggers one shot 331 which controls busy/illegal ID signal generator 332 whose output appears on line 335 as an input to audio mixer 228. Therefore the user is notified by another distinctive tone that either his ID code was incorrect, or he has requested a service type to which he is not entitled. At the end of an appropriate period of time determined by program read only memory 315, scan line 317 again goes to its logical one state and channel counter 276 resumes its sequential polling of the channels of the system.

To continue the example of proper operation of the second preferred embodiment, assume that the user of dictate station 116 has presented controller 110 with a valid ID code and service request code and furthermore that recorder 117 is a recorder dedicated to the type of service requested and is available for seizure.

In the second preferred embodiment of the present invention, one channel of the system is dedicated as a controller channel. This is the channel on which all communication between the controller and the various system recorders is conducted. Upon detection of a valid ID and service request code, an output will appear on preset cable 336. It will be understood that preset cable 336 represents either a multiconductor cable or a logic state on the output bus of microprocessor 310. Note in FIG. 3 that microprocessor 310 has as an input thereto, cable 337, whereby the microprocessor keeps track of the channel associated with the dictate station initiating the service request signal. The output on preset cable 336 sets channel counter 276 to the number associated with the controller channel. Thus transceiver section 316 of controller 110 is now locked to communication with all recorders in the system which are "listening" on the controller channel.

Turning again to FIG. 2, the response of an available recorder to a signal from the controller will be explained. When recorder 156 of recording station 117 is available for seizure, an available tone appears on line 340 which is the input to preset control 341. Preset control 341 sets channel latches 361 to the controller channel thus causing recording station 117 to be tuned to signals from the controller channel. As will be obvious to those skilled in the art, the available signal may simply be the absence of a seized signal with appropriate logic associated with the seize tone output of recorder 156. Microprocessor 310, having determined that recorder 117 is to be tested for availability puts out a signal on cable 338 which is encoded by instruction encoder 339.

In the preferred embodiment, each recorder is identified by unique sequence of digital bits which must precede any instruction to that recorder. Instruction encoder 339 first generates a bit combination corresponding to recorder 117 which is provided as an input to audio mixer 228 and transmitted, on the controller channel, to transmission line 10. This set of bits is demodulated and appears at buffer 141' and thus on output line 342 and is provided as an input to controller decode 343. Controller decoder 343 detects the sequence of bits associated with recorder 117 and sets available signal latch 344 which opens a gate allowing the available signal on line 340 to appear on line 345 as an input to audio mixer 159. The output 160 of audio mixer 159 is an input to modulator 155' and thus the available signal is transmitted back to the controller on the higher frequency of the transmit-receive frequency pair associated with the controller channel. This tone is detected by available signal decoder 346 which puts a logical one on line 347, informing microprocessor 310 that recorder 117 is indeed available for seizure.

The microprocessor again causes its instruction encoder 339 to generate the bit sequence associated with recorder 117 then encodes a signal which causes controller decoder 343 to set channel latches 361 to a number associated with channel three. Now frequency synthesizer 121 is latched to channel three and dictate station 116 seizes recorder 156 associated with recorder station 117 when control signal decoder 177 detects the service request signal on channel three. The presence of a seize tone on the upper frequency of the transmit-receive pair comprising channel three is detected on line 142 of dictate station 116 causing a logical one to appear on line 181. This causes output 183 of NOR gate 182 to go to zero, thus terminating the signal from service request generator 184.

If recording station 117 had not been available, either recording station 117 was inoperative or it had been seized by another dictate station. Had it been seized by another dictate station, it will be obvious that channel latches 361 had set frequency synthesizer 121 to a channel other than the controller channel and the sequence of bits associated with recorder 117 being transmitted by controller 110 on the controller channel would not have been detected. The program from program read only memory 315 causes microprocessor 310 to interpret the absence of an available signal output on line 347 a predetermined length of time after the recorder is polled for availability as a signal that the recorder is not available. Thus, depending on the service request type the microprocessor 310 would have searched for another available recorder dedicated to that service, or have generated an output on line 330 in order to activate busy/illegal ID encoder 332 and thus inform the user of dictate station 116 that all the recorders dedicated to the requested service are busy.

When a previously-seized recorder such as recorder 156 has seizure terminated, the available signal again appears on line 340 and activates preset control 341 which sets channel latches 361 back to the controller channel. Thus at the termination of seizure, recorder station 117 is again "listening" to the controller channel.

The foregoing descriptions of two preferred embodiments have been by way of examples of the present invention and it will be understood that other embodiments are possible within the scope of the following claims.

What is claimed is:

1. In a central recording system having at least one dictate station, a plurality of recorders, each recorder of said plurality of recorders having means for generating an available signal when said recorder is not in use, the improvement of:

ultrasonic transmitter means associated with each recorder of said plurality of recorders for transmitting a signal having a carrier frequency uniquely characteristic of said each recorder;

modulation means associated with said ultrasonic transmitter means for modulating said available signal onto said signal;

input means associated with said dictate station for providing said signal to said dictate station;

demodulator-detector means associated with said dictate station responsive to said signal when of a particular received frequency for detecting the presence of said available signal;

frequency scanning means associated with said demodulator-detector means for varying said received frequency according to a predetermined sequence of frequencies in response to the absence of said available signal and for maintaining said received frequency at said carrier frequency in response to the presence of said available signal.

2. In a central dictation system having a plurality of recorders, each recorder providing playback signals, at least one dictate station for providing audio signals wherein each recorder may be placed in a condition to receive said audio signals from said dictate station upon establishment of a seized condition, the improvement of:

connecting means comprising a single transmission line for connecting said plurality of recorders to said dictate station;

channel means for defining a plurality of channels within said system, each channel comprising a first frequency and a second frequency, wherein each of said plurality of recorders is associated with one of said plurality of channels;

transmit-receive means associated with said dictate station for providing transmission of said audio signals at said first frequency and reception of said playback signals at said second frequency in response to said establishment of said seized condition.

3. The recording system of claim 2 wherein for each of said plurality of channels, said first frequency differs from said second frequency by a constant frequency difference.

4. A central dictation system as recited in claim 2 further including scanning means associated with said dictate station for alternately and in a predetermined sequence rendering said dictate station responsive to each of said plurality of channels.

5. A central dictation system as recited in claim 4 wherein said scanning means is rendered inoperative in response to an absence of said seized condition on a particular one of said plurality of channels to which said dictate station has been rendered responsive.

6. In a central dictation system having at least one recorder having means providing an available signal condition when said recorder is not in use, a plurality of dictate stations having means selectively operable to provide a service request signal, the improvement of:

connecting means comprising a single transmission line for connecting said plurality of dictate stations with said recorder;

channel means for defining a plurality of channels within said system, each channel comprising a transmit-receive frequency pair, wherein each of said plurality of dictate stations is associated with one of said plurality of channels;

recorder channel selection means associated with said recorder for selecting one of said plurality of channels;

control means operatively interconnected with said connecting means responsive to said available signal condition and to said service request signal at a particular dictate station associated with a particular channel for causing said recorder channel selection means to select said particular channel.

7. A central dictation system as recited in claim 6 further including identification signal means associated with each of said plurality of dictate stations selectively operable for providing identification signals;

access means associated with said control means for defining a plurality of valid identification signals and for preventing said recorder channel selection means from selecting said particular channel when an identification signal present on said particular channel is not one of said plurality of valid identification signals.

8. A central dictation system as recited in claim 6 further including at least one priority recorder for recording priority dictation and having priority recorder channel selecting means for selecting one of said plurality of channels and means for providing a priority unavailable signal corresponding to seizure of said priority recorder by one of said plurality of dictate stations;

priority signal means associated with at least one of said plurality of dictate stations for generating a priority signal condition;

priority means associated with said control means for causing said priority recorder channel selecting means to select a particular one of said plurality of channels in response to the presence of said priority signal condition on said particular one of said plurality of channels.

9. A central dictation system as recited in claim 8 further including busy means for providing a busy signal on said particular one of said plurality of channels in response to the concurrent presence of said priority signal condition on said particular one of said plurality of channels and said priority unavailable signal.

10. In a central dictation system including at least one dictate station, a plurality of recorders, each recorder to said plurality of recorders being alternately in either a seized condition operatively connecting said recorder to said dictate station for recording dictation or a condition to be seized by said dictate station, the improvement of:

connecting means operatively connecting said dictate station with said plurality of recorders;

a plurality of signal means for providing a plurality of available signals;

each of said plurality of signal means being associated with one recorder of said plurality of recorders and providing one of said plurality of available signals at a frequency uniquely characteristic of said one recorder;

detection means associated with said dictate station for placing said dictate station in a condition to seize said one recorder in response to said one of a plurality of available signals being present at said frequency characteristic of said one recorder.

11. A central dictation system as recited in claim 10 wherein:

said detection means includes scanning means for rendering said detection means responsive to each of said plurality of available signals alternately and in a predetermined sequence.

12. A central dictation system as recited in claim 11 wherein said scanning means is rendered inoperative in response to the presence of a particular one of said plurality of available signals to which said dictate station is rendered responsive and said scanning means is rendered operative in response to the absence of said particularly one of said available signals to which said dictate station is rendered responsive.

13. In a recording system having a dictate station for selectively providing dictation to each of a plurality of recorders:

first transmitter means for transmitting a first carrier signal having a first carrier frequency;

first modulation means for modulating said first carrier signal with an available signal when one of said plurality of recorders is available for recording dictation from said dictate station;

second transmitter means for transmitting a second carrier signal having a second carrier frequency;

second modulation means for modulating said second carrier signal with said available signal when another of said plurality of recorders is available for recording dictation from said dictate station;

scanning means for operatively connecting said dictate station to said one of said plurality of recorders for the recording of dictation modulated on a third carrier signal having a third carrier frequency in response to said first carrier signal being modulated by said available signal and for alternately connecting said dictate station to said another of said plurality of recorders for the recording of dictation modulated on a fourth carrier signal having a fourth carrier frequency in response to said second carrier signal being modulated by said available signal and said first carrier signal not being modulated by said available signal.

14. In a recording system having a plurality of dictate stations for selectively providing dictation for recording to a plurality of recorders:

circuit means for simultaneously providing a plurality of carrier signals at all of said plurality of dictate stations and all of said plurality of recorders, each of said plurality of carrier signals having a carrier frequency different from the carrier frequencies of others of said carrier signals;

operating means for rendering a first of said plurality of recorders operable by operating signals modulated on a first of said plurality of carrier signals at a first of said plurality of dictate stations and simultaneously rendering a second of said plurality of recorders operable by operating signals modulated on a second of said plurality of carrier signals at a second of said plurality of dictate stations.

15. The recording system of claim 14 in which an available signal is modulated on a third of said plurality of carrier signals when said first of said plurality of recorders is available for the recording of dictation and in which said operating means renders said first of said plurality of recorders operable only in response to said available signal.

16. The recording system of claim 15 in which, in response to the absence of said available signal, said operating means alternately renders a third of said plurality of recorders operable by operating signals modulated on a fourth of said plurality of carrier signals at said first of said plurality of dictate stations.

17. The recording system of claim 16 in which said first of said plurality of dictate stations is selectively operable to provide said operating signals and in which said operating means is operable when said first of said plurality of dictate stations is inoperable to provide said operating signals.

18. The recording system of claim 14 in which said operating means renders said first of said plurality of recorders operable in response to first request signals modulated on said first of said plurality of carrier signals at said first of said plurality of dictate stations and in which said operating means, in response to second request signals modulated on said first of said plurality of carrier signals at said first of said plurality of dictate stations, alternately renders a third of said plurality of recorders operable by operating signals modulated on said first of said plurality of carrier signals at said first of said plurality of dictate stations.

19. The recording system of claim 18 in which said operating means renders said second of said plurality of recorders operable in response to third request signals modulated on said second of said plurality of carrier signals at said second of said plurality of dictate stations and in which said operating means is inoperable to render any of said plurality of recorder operable in response to said third request signals modulated on said first of said plurality of carrier signals at said first of said plurality of dictate stations.

20. The recording system of claim 19 in which said operating means provides an error signal at said first of said plurality of dictate stations in response to said third request signals modulated on said first of said plurality of carrier signals at said first of said plurality of dictate stations.

* * * * *